April 11, 1950 F. DE FREMERY 2,504,008

FORK-CIRCUIT FOR CONNECTING A TWO-WIRE LINE TO WIRELESS TRANSMITTING AND RECEIVING CHANNELS

Filed July 15, 1946

FRANK DE FREMERY.
INVENTOR.

BY Fred M. Vogel

AGENT.

Patented Apr. 11, 1950

2,504,008

UNITED STATES PATENT OFFICE 2,504,008

FORK CIRCUIT FOR CONNECTING A TWO-WIRE LINE TO WIRELESS TRANSMITTING AND RECEIVING CHANNELS

Frank de Fremery, Eindhoven, Netherlands, assignor to Hartford National Bank and Trust Company, Hartford, Conn., as trustee Application July 15, 1946, Serial No. 683,707
In the Netherlands March 15, 1943

Section 1, Public Law 690, August 8, 1946
Patent expires March 15, 1963

3 Claims. (Cl. 178—44)

This invention relates to a fork-circuit for connecting a two-wire line to wireless transmitting and receiving channels. A circuit of this kind comprises a fork transformer connecting the two-wire line to the transmitting and receiving channels, and a so-called line balance which must exhibit the same variations in impedance as the two-wire line and which must ensure that the coupling of the transmitting and the receiving channels is as small as possible. However, this line balance is never perfect so that there invariably exists a definite coupling. Especially when it must be possible for several two-wire lines having different impedances to be connected to the fork transformer, considerable differences of the impedances between the two-wire line and the line balance may occur, resulting in the coupling between the transmitting and the receiving channels being rendered excessive. This becomes manifest by so-called echo phenomena, i. e. the received signal is transmitted to the transmitting channel via the fork transformer and re-transmitted and received in the receiver at the other end of the connection and there heard as as echo. In addition, feedback coupling may occur, resulting in self-oscillating of the circuit arrangement.

In order to avoid these phenomena, blocking devices, so-called echo suppressors, are arranged in the transmitting and the receiving channels, which are controlled by the transmitted signal or the received signal. The circuit may be realised, for example, in such manner that in the position of rest, that is to say when no conversation is held, the blocking device of the transmitting channel is closed and that of the receiving channel is open. In this position the circuit is ready for the receipt of signals which are subsequently led to the subscriber through the fork transformer and the two-wire line. When this subscriber is speaking, the speech currents are suplied through the two-wire line and the fork transformer to the transmitting channel wherein a portion of the speech currents is taken off and rectified, and the blocking device of the receiving channel is closed and that of the transmitting channel is opened with the aid of the direct voltage obtained. Now, the speech currents are passed by the transmitting channel and supplied to the emitter in which they are modulated on a carrier-wave. Subsequently, the modulated carrier wave is transmitted.

To save energy, it is desirable that the carrier wave should be transmitted by the emitter of the transmitting channel only if the subscriber at the end of the two-wire line is speaking. To this end, there is provided a relay, the so-called carrier-wave relay, which is controlled by the rectified speech current which also controls the blocking devices. As soon as speech currents are supplied to the transmitting channel, the carrier-wave relay is energized and the carrier wave switched into the emitter. In this case the switching phenomenon involved by the switching-in of the carrier wave must be prevented from being transmitted via the receiving channel to the subscriber, who otherwise would hear this as a switching-in click. Consequently, it must be ensured that the blocking device of the receiving channel is already blocked before the carrier wave is switched-in. By giving the time constant of the blocking device a value smaller than that of the carrier-wave relay, this condition may be easily satisfied.

Conditions are different, however, when the carrier wave is switched out, when the subscriber stops speaking. If the time constant of the blocking device is smaller than that of the carrier-wave relay, the blocking device of the receiving channel will already be opened before the carrier wave is switched out, due to which the subscriber hears a switching-out click. In this connection it is to be considered that the time which elapses between the moment when the receiving channel is opened and the moment when the carrier wave is switched out will be greater than the time which elapses between the moment of closure of the receiving channel and the moment when the carrier wave is switched-in. This is connected with the property of the carrier-wave relay, which, like any electro-magnetic relay, is de-energized at a current which is smaller than that at which it is energized due to hysteresis phenomena in the magnetic circuit.

The present invention purports to provide means whereby the switching-out click is avoided.

According to the invention, this object is achieved by that the control current to which the echo suppressors are switched-over is adjusted to a value which is higher (smaller) than the values of the currents at which the carrier-wave relay is energized and de-energized.

Figure 1:
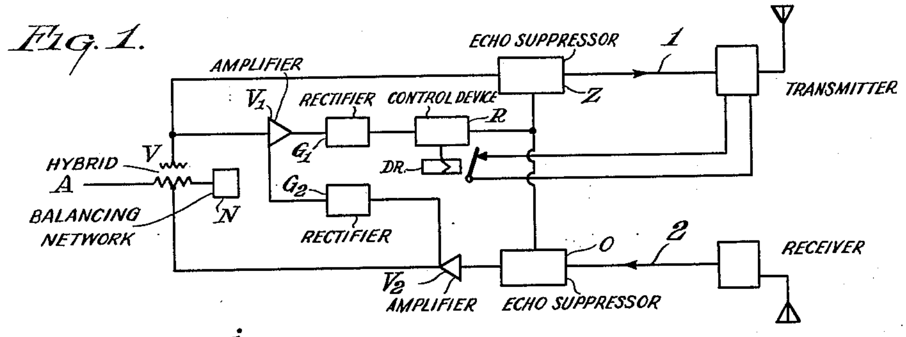
Fig. 1 is a block schematic diagram of a circuit embodying my invention.

Figure 1 shows a circuit arrangement of such a fork device. It comprises a fork transformer V and a line balance N by which the signal emitted by subscriber A is transmitted to transmitting channel 1 and the signal received through receiving channel 2 is led to the subscriber. It further comprises two blocking devices Z and O, which are arranged to avoid echo phenomena and feedback phenomena. In the position of rest transmitting channel 1 is blocked by Z and O is open. If, now, A is speaking, Z must be opened and O blocked. To this end, the speech voltage in the transmitting channel is also supplied to an amplifier $V_1$ and a subsequent rectifier $G_1$. The latter supplies a rectified control current which energizes a carrier-wave relay $D_r$ through a device R which is shown more clearly in Figure 3, the carrier wave of the transmitter being switched-in by the said carrier-wave relay. This being done, the blocking device O is closed by the rectified control current and the blocking device Z is opened. The speech currents in the emitter are now modulated on the carrier wave and transmitted.

After A has stopped speaking, relay $D_r$ is released and the transmitting channel is re-blocked and the receiving channel released, so that received signals are transmitted to A. To prevent the received signal which is transmitted to the transmitting channel due to the asymmetry of the fork circuit, from producing via amplifier V a control current in the output circuit of rectifier $G_1$, which would lead to carrier-wave relay $D_r$ being intermittently switched-in and switched-out and the blocking devices being intermittently switched-over, the received signals are supplied to a rectifier $G_2$ which supplies to amplifier $V_1$ such a voltage that it is blocked. In this case in spite of the asymmetry of the fork circuit the received signal cannot produce any control current in the output circuit of rectifier $G_1$, so that the carrier wave remains switched-out, the transmitting channel blocked and the receiving channel open.

Figure 2:
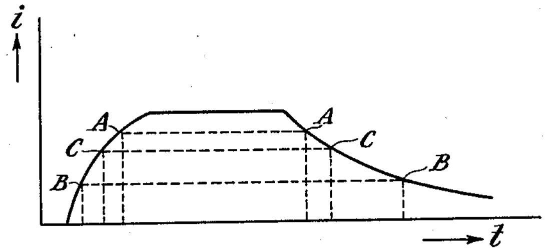
Fig. 2 is a graph illustrating the characteristic of the relay used in Fig. 1.

In this circuit occurs the phenomenon that the switching-out click of the carrier wave can be heard by A. This is due to the fact that relay $D_r$, by which the carrier wave is switched-in and out, is energized at a value of the control current other than that at which it is released. Figure 2 shows the characteristic of the relay. The relay is energized only at a definite value A of the control current $i$ and is released at a value B which lies much lower. Before the energisation of the relay and hence before the carrier wave is switched-in, when the control current has attained the value C, the blocking device Z is opened and O is closed. Subsequently, the current attains the value A, at which the relay is energized. When the control current decreases, when the subscriber A stops speaking, at first blocking device Z will be blocked and O will be opened, again at the value C, after which at a lower value B of the control current the relay is released. Consequently, the carrier wave is switched out after O has been opened, so that the switching-out click will be heard by A.

Figure 3:
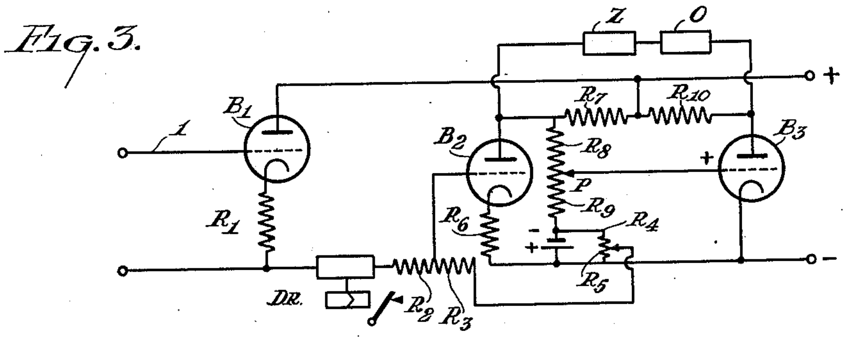
Fig. 3 shows a relay control circuit.

This may be avoided by utilizing a circuit arrangement of the kind shown in Figure 3 and by means of a suitable adjustment thereof.

Relay $D_r$ controlling the carrier wave is here constructed in such manner that upon attraction of the relay the carrier wave is switched-out and upon release thereof it is switched in. The blocking devices Z and O are arranged in series and connected to the voltage set up at resistances $R_7$ and $R_{10}$. They are realized in such manner that at a definite value of the voltage set up at $R_7$ and $R_{10}$ they are switched-over, whereby Z releases the blocking channel and O blocks the receiving channel. The signal amplified by amplifier $V_1$ and rectified by rectifier $G_1$ is supplied as a negative voltage to the grid of tube $B_1$. If no signal is present, i. e. in the condition of hearing, tube $B_1$ conveys the normal anode current $i_0$ shown in Figure 4, which is adjustable by means of the value of cathode resistance $R_1$; the carrier-wave relay is then attracted (the carrier wave is switched out) and tube $B_2$ receives a positive grid voltage from potentiometer $R_2R_3$ and a negative grid voltage from potentiometer $R_4R_5$ and from cathode resistance $R_6$. This tube also conveys the normal anode current and the anode voltage is low due to the voltage loss in the anode resistance $R_7$. Consequently, the potential of point P on potentiometer $R_8R_9$ is also low, so that tube 3 is not traversed by current. As soon as speaking begins, the grid of $B_1$ acquires a negative potential (originating from the rectified signal to be transmitted), the anode current $i$ decreases and the positive voltage of potentiometer $R_2R_3$ becomes smaller. As soon as the anode current $i$ has attained the value $i_1$, tube $B_2$ is blocked, the potential of P increases and tube $B_3$ begins to convey current. The blocking devices are now switched-over, so that O is blocked and Z is opened. Now, the anode current $i$ of tube $B_1$ decreases further and when the value $i_2$ is attained, carrier-wave relay $D_r$ is released and the carrier wave is switched-in. This condition is maintained during the conversation. When the conversation is over the anode current $i$ of tube $B_1$ increases again; at $i_3>i_2$ the carrier-wave relay is energized and the carrier wave is switched out. It is not before the current has increased further and attained the value $i_1$ that the blocking devices are switched-over.

Figure 4:
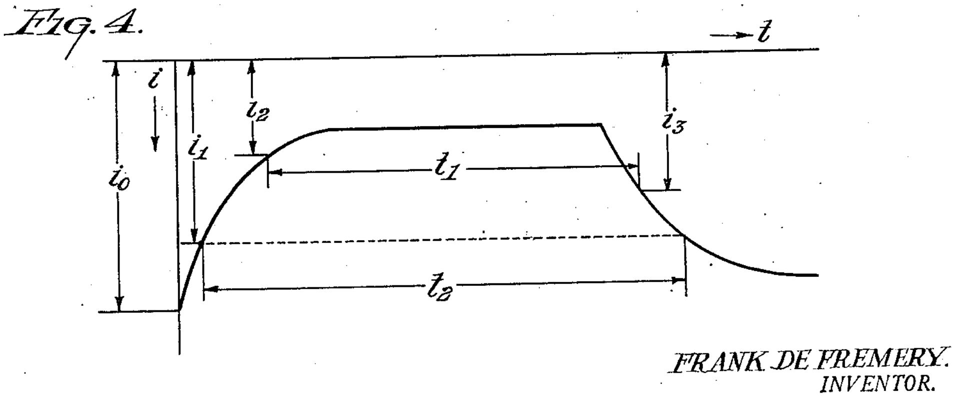
Fig. 4 is a graph showing the characteristics of the device of Fig. 3.

From Figure 4 it appears that the time $t_1$ during which the carrier wave is switched-in is wholly located within the time $t_2$ during which the switched-over position of the echo suppressor is maintained. It is essential thereto that the value of the control current $i_1$ at which the blocking device is switched-over is not only higher than the value $i_2$ of the control current at which the carrier-wave relay is released but also higher than the value $i_3$ at which the carrier-wave relay is energized.

The circuit arrangement may alternatively be such that the carrier wave is switched-in by the attraction of relay $D_r$ and switched-out by the release thereof. In this case it must be ensured that the control voltage at which the blocking devices are switched over is smaller than the values of the currents at which the carrier-wave relay is energized and de-energized.

What I claim is:

1. In a two-way signal transmission system, the combination comprising a transmitting channel provided with a transmitter and a first normally inoperative echo-suppressor preceding said transmitter, a receiving channel provided with a receiver and a second normally operative echo-suppressor following said receiver, and signal responsive switching apparatus adapted to directionally control signal transmission in said channels, said apparatus including a rectifier coupled to said transmitting channel for producing a control voltage during the existence of a signal therein, an electromagnetic relay arranged to actuate said transmitter and a current generating control device responsive to said control voltage and coupled to actuate said first and second suppressors and to energize said relay, said first and second suppressors being arranged to be simultaneously rendered operative and inoperative respectively at a predetermined value of control current which is smaller than the respective values of current at which said relay is energized and deenergized.

2. In a two-way signal transmission system, the combination comprising a transmitting channel provided with a transmitter and a first normally inoperative echo-suppressor preceding said transmitter, a receiving channel provided with a receiver and a second normally operative echo-suppressor following said receiver, and signal responsive switching apparatus adapted to directionally control signal transmission in said channels, said apparatus including an amplifier coupled to said transmitting channel, a first rectifier coupled to the output of said amplifier for producing a control voltage during the existence of a signal therein, a second rectifier coupled to said receiving channel for producing a disabling voltage during the existence of a signal therein, means to apply said disabling voltage to said amplifier to render same inoperative, an electromagnetic relay arranged to actuate said transmitter and a current generating control device responsive to said control voltage and coupled to actuate said first and second suppressors and energize said relay, said first and second suppressors being arranged to be rendered simultaneously operative and inoperative respectively at a predetermined value of control current which is smaller than the respective values of current at which said relay is energized and deenergized.

3. A system as set forth in claim 2 further including a subscriber station and a hybrid transformer coupling said channels to said station.

FRANK DE FREMERY.

REFERENCES CITED

The following references are of record in the file of this patent:

UNITED STATES PATENTS

| Number | Name | Date |
|---|---|---|
| 1,639,773 | Hamilton | Aug. 23, 1927 |
| 1,706,472 | Wright | Mar. 26, 1929 |
| 2,258,966 | Bjornson | Oct. 14, 1941 |